United States Patent
Foskey et al.

(10) Patent No.: US 10,407,157 B2
(45) Date of Patent: Sep. 10, 2019

(54) SPINNER FAIRING ASSEMBLY (71) Applicant: Bell Helicopter Textron Inc., Fort Worth, TX (US)

(72) Inventors: Christopher Foskey, Keller, TX (US); Frank B. Stamps, Colleyville, TX (US); Richard Rauber, Euless, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 1218 days.

(21) Appl. No.: 13/828,495

(22) Filed: Mar. 14, 2013

(65) Prior Publication Data

US 2014/0271223 A1 Sep. 18, 2014

(51) Int. Cl.
*B64C 11/14* (2006.01)
*B64C 29/00* (2006.01)

(52) U.S. Cl.
CPC .......... *B64C 11/14* (2013.01); *B64C 29/0033* (2013.01); *Y10T 29/49316* (2015.01)

(58) Field of Classification Search
CPC ....... B64C 11/14; B64C 29/0033; B64C 7/02; B64C 11/02; B64C 27/021; B64C 27/32; B64C 27/52; Y10T 29/49316
USPC ...................................... 416/245 R, 148–149
See application file for complete search history.

(56) References Cited

U.S. PATENT DOCUMENTS

| | | | |
|---|---|---|---|
| 1,701,762 A * | 2/1929 | Pitcairn ................... | B64C 27/41 244/17.11 |
| 2,793,702 A * | 5/1957 | Cushman ................ | B64C 11/14 416/245 R |
| 3,080,002 A * | 3/1963 | Du Pont ................. | B64C 27/41 416/102 |
| 3,128,964 A * | 4/1964 | Le Bel .................... | B64C 30/00 244/117 A |
| 3,829,240 A * | 8/1974 | Edenborough ..... | B64C 29/0033 416/223 R |
| 4,569,629 A * | 2/1986 | Ferris ...................... | B64C 27/32 416/134 A |
| 4,699,568 A * | 10/1987 | Harlamert ............... | B64C 11/14 416/155 |
| 6,260,793 B1 * | 7/2001 | Balayn ................ | B64C 29/0033 244/130 |
| 8,424,799 B2 * | 4/2013 | Popelka ................ | B64C 27/001 244/17.27 |
| 2010/0021301 A1 * | 1/2010 | Stamps ................... | B64C 11/30 416/112 |
| 2010/0209242 A1 * | 8/2010 | Popelka ................ | B64C 27/001 416/1 |

* cited by examiner

*Primary Examiner* — Bryan M Lettman
*Assistant Examiner* — Charles W Nichols (57) ABSTRACT

An apparatus comprising a spinner fairing assembly comprising a spinner configured to be fixed relative to a gimbaled yoke coupled to a mast system, and a spinner base configured to be fixed relative to the mast system. A spinner fairing assembly comprising a spinner aligned along a first axis, and a spinner base aligned along a second axis and configured to interface with the spinner, wherein the spinner is configured to transition between a neutral position and a canted position with respect to the spinner base, wherein the first axis and the second axis are coincident in the neutral position, and wherein the first axis and the second axis are not coincident and meet at an origin within the spinner in the canted position.

16 Claims, 6 Drawing Sheets

SPINNER FAIRING ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Spinner fairings may be employed to reduce the overall aerodynamic drag of an aircraft. Conventional spinner fairings used with rotor system (e.g., a tilt rotor system) may be in a fixed orientation with respect to a mast or nacelle. In such examples, the spinner fairing may require large fairing cutouts with sufficient clearance for fairing hardware connections (e.g., bolt linkages) and proper range of motion for during operation (e.g., flapping, feathering, coning, etc.). Large cutouts or voids in the exterior of the spinner fairing may degrade the performance and/or the ability to reduce aerodynamic drag by the spinner fairing. In an embodiment, it may be desirable to further improve the aerodynamic properties (e.g., further reduce the overall aerodynamic drag) of a spinner fairing to improve the overall performance of an aircraft system.

SUMMARY

In one aspect, the disclosure includes an apparatus comprising a spinner fairing assembly comprising a spinner configured to be fixed relative to a gimbaled yoke coupled to a mast system, and a spinner base configured to be fixed relative to the mast system.

In another aspect, the disclosure includes a spinner fairing assembly comprising a spinner aligned along a first axis, and a spinner base aligned along a second axis and configured to interface with the spinner, wherein the spinner is configured to transition between a neutral position and a canted position with respect to the spinner base, wherein the first axis and the second axis are coincident in the neutral position, and wherein the first axis and the second axis are not coincident and meet at an origin within the spinner in the canted position.

In yet another aspect, the disclosure includes a method comprising providing a spinner fairing assembly comprising a spinner aligned along a first axis, and a spinner base aligned along a second axis and configured to interface with the spinner, wherein the spinner is configured to transition between a neutral position and a canted position with respect to the spinner base, wherein the first axis and the second axis are coincident in the neutral position, and wherein the first axis and the second axis are not coincident and meet at an origin within the spinner in the canted position.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of a spinner fairing assembly (SFA), a rotor system comprising a SFA, and methods of using the same. In an embodiment, the SFA may be employed to improve the aerodynamic performance (e.g., reduce aerodynamic drag) while maintaining normal operation functionality (e.g., during flapping, feathering, coning, etc.), as will be disclosed herein.

Figure 1:
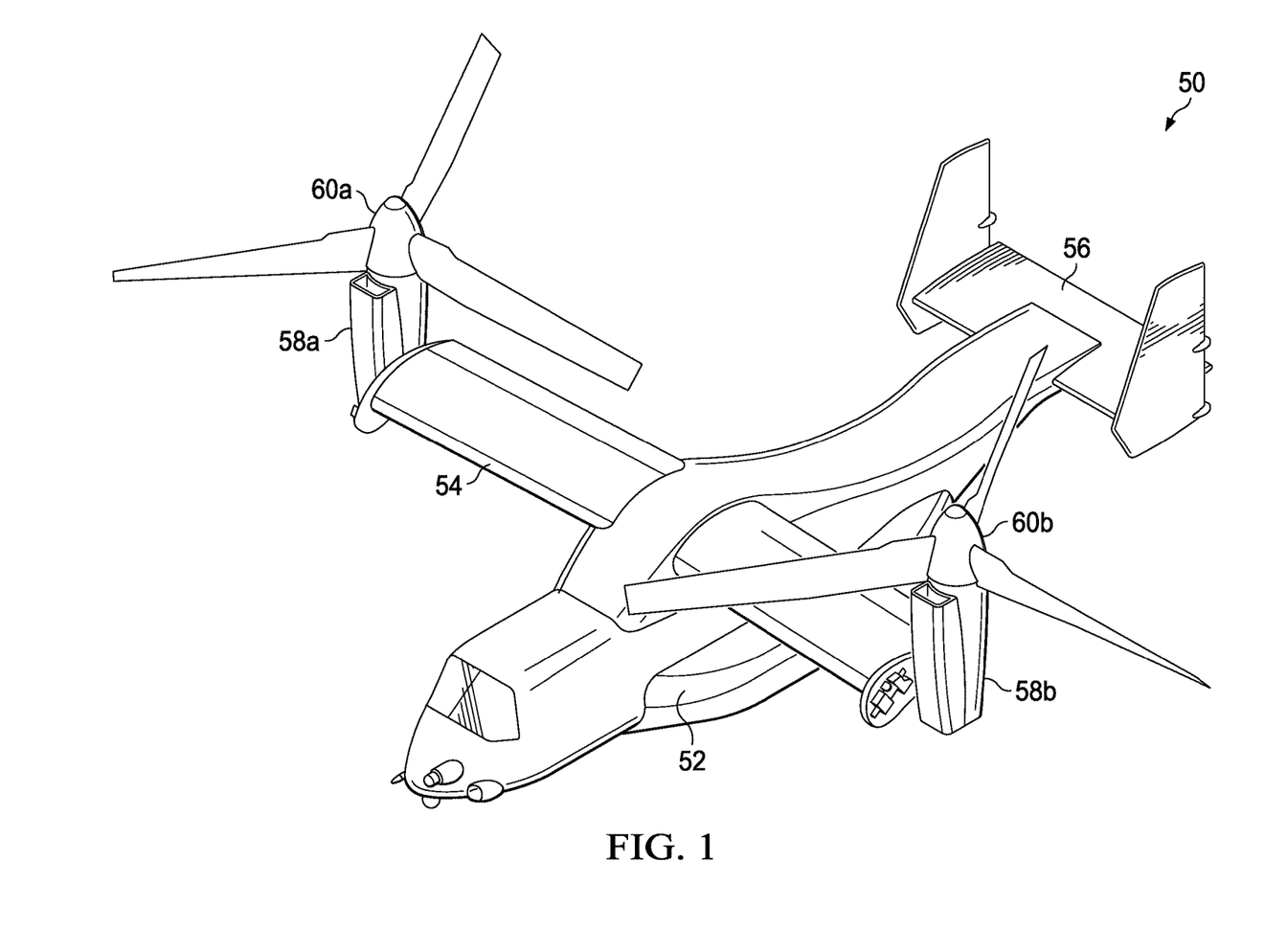
FIG. 1 is a perspective view of an embodiment of a rotor aircraft.

In an embodiment, a SFA may be incorporated and/or integrated with a rotor aircraft (e.g., a tilt rotor aircraft, a helicopter, etc.) having one or more rotor systems (e.g., a main rotor, a tail rotor, etc.). As such, a SFA may be employed to provide an aerodynamic surface during operation. For example, the SFA may provide an aerodynamic surface in one or more directions, for example, in two directions (e.g., a longitudinal direction and a horizontal direction) for a tilt rotor aircraft. Referring to FIG. 1, a tilt rotor aircraft 50 is illustrated. In an embodiment, a tilt rotor aircraft 50 may generally comprise a fuselage 52, a wing member 54, and a tail member 56, and a plurality of engines 58a, 58b. While described as a single wing member 54, it is understood that the wing member 54 may be formed from separate components such that two or more wing members 54 are coupled to fuselage 52 (e.g., each side of the fuselage 52 may comprise a separate wing member 54). The aircraft 50 may also include a first rotor system 60a and a second rotor system 60b. The first rotor system 60a is located on an end portion of a first side of the wing member 54, while the second rotor system 60b is located on a second side of the wing member 54. The first rotor system 60a and the second rotor system 60b may be substantially symmetric of each other about the fuselage 52.

Figure 2:
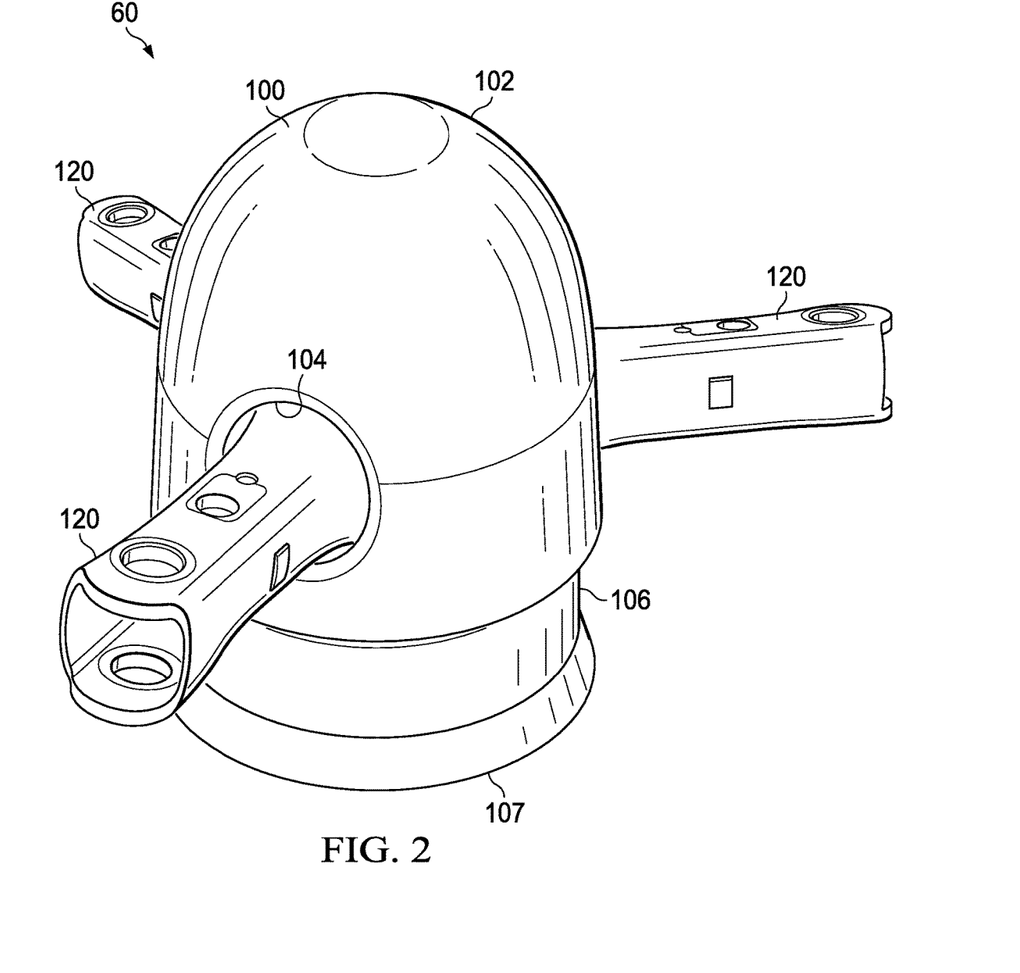
FIG. 2 is a perspective view of an embodiment of a spinner fairing assembly.
Figure 3:
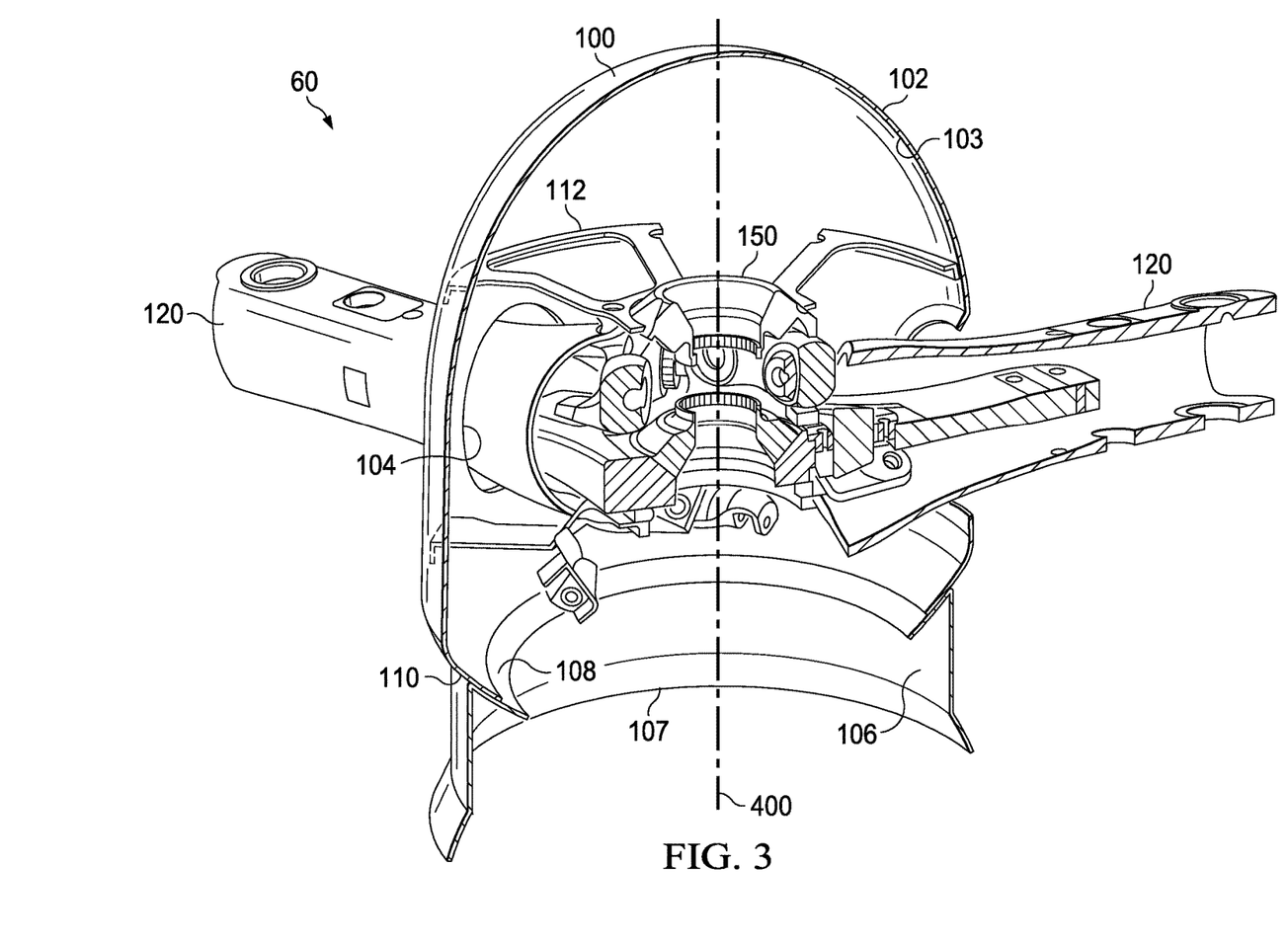
FIG. 3 is a partial cut-away view of an embodiment of a spinner fairing assembly in a centered position.
Figure 4:
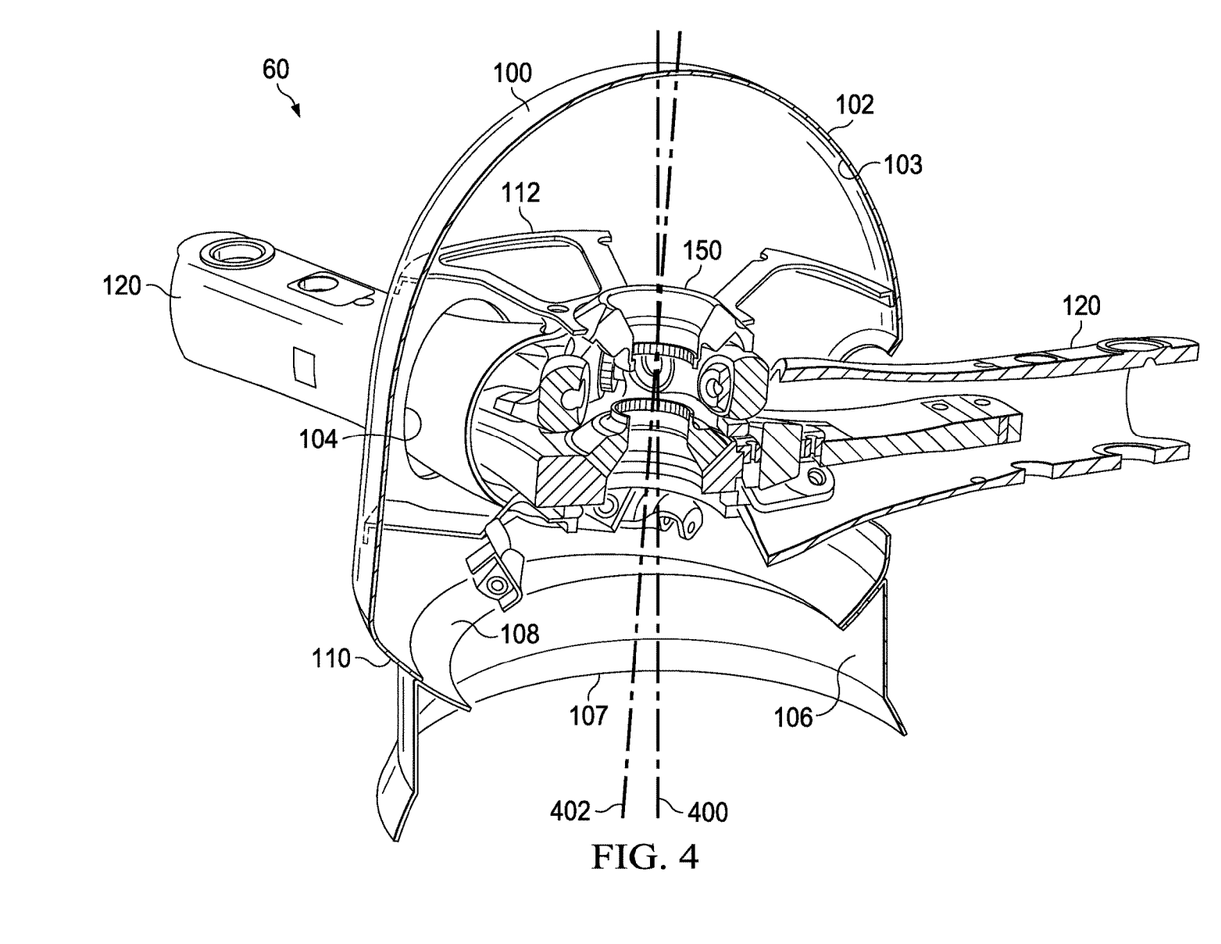
FIG. 4 is a partial cut-away view of an embodiment of a spinner fairing assembly in a tilted position.

Referring to FIG. 2-4, an embodiment of a rotor system 60 is illustrated. As shown in the embodiments of FIGS. 3 and 4, the rotor system 60 may generally comprise a SFA 100, a gimbaled yoke 150, and a plurality of fairings 120. In an embodiment, the gimbaled yoke 150 may be generally configured to couple a main support mast (not shown but generally extending along an axis 400) to a plurality of blades (not shown) via the fairings 120. The gimbaled yoke 150 may include any other suitable rotor system components as would be appreciated by one of ordinary skill upon viewing this disclosure. In an embodiment, the gimbaled yoke 150 may allow the blades to rotate about the mast (e.g., to provide lift), to change pitch while rotating either collectively or cyclically (e.g., to accommodate vertical loads or to maneuver), perhaps to pivot within the gimbaled yoke 150 plane that contains the fairings 120 (e.g., to provide lead-lag control), and/or any other articulation or movement as would be appreciated by one of ordinary skill in the art upon viewing this disclosure. As such, the gimbaled yoke 150 is configured to pivot the gimbaled yoke 150 plane relative to the axis 400.

In an embodiment, the gimbaled yoke 150 may be formed of a metal, a plastic, a composite material (e.g. carbon fiber or fiberglass), combinations thereof, or any other suitable material as would be appreciated by one of ordinary skill in the art upon viewing this disclosure. Additionally, in an embodiment, the gimbaled yoke 150 may be configured to support any suitable number of blades and/or fairings 120, for example, 2, 3, 4, 5, 6, 7, 8, 9, 10, etc.

In an embodiment, the SFA 100 may be generally configured to cover and/or shield the gimbaled yoke 150, for example, to prevent or reduce damage to the gimbaled yoke 150 from environmental conditions (e.g., rain, water, snow, sand, debris, etc.) and to provide improved aerodynamic performance during operation. In an embodiment, the SFA 100 may be configurable between a neutral configuration and a canted configuration, as will be disclosed herein.

In an embodiment, the SFA 100 may generally comprise a spinner 102, a spinner base 106, and a plurality of fairing ports 104. The spinner 102 and/or the spinner base 106 may be formed of a metal, a plastic, a glass fiber, a carbon fiber, other composite materials, any other rigid or semi-rigid material as would be appreciated by one of ordinary skill in the art upon viewing this disclosure, or combination thereof.

In an embodiment, the spinner 102 may be generally rounded (e.g., parabolic, conical, spherical, parabolic, egg shaped, bullet shaped, bell shaped, etc.), axially symmetrical (e.g., about the axis 400), and hollow. The spinner 102 may comprise a lower surface 110 and the plurality of fairing ports 104, as will be disclosed herein. In an embodiment, the spinner 102 is a section of a sphere centered on an origin (e.g. a center of the tilting/canting movement) for the gimbaled yoke 150. Additionally, the spinner 102 may be coupled to the gimbaled yoke 150 and/or a rotor assembly such that the spinner 102 is in a fixed position relative to the gimbaled yoke 150 and/or rotor assembly. For example, in the embodiments of FIGS. 3-4, an interior surface 103 of the spinner 102 may be coupled to the gimbaled yoke 150 via one or more mounting brackets 112, the one or more mounting bracket comprises two arms connected above the gimbaled yoke and extending out to a circumferential attachment section which conforms to the inner surface of the spinner fairing. In such an embodiment, the spinner 102 may be configured to move with the gimbaled yoke 150, as will be disclosed herein.

In an embodiment, the spinner base 106 may be positioned proximate and/or adjacent to the lower surface 110 of the spinner 102. The spinner base 106 may generally be cylindrical and comprises an upper surface 108 and a lower surface 107. In an embodiment, the upper surface 108 is a section of a sphere centered on an origin within the gimbaled yoke 150. In an embodiment, the spinner base 106 may comprise and/or be formed with a nacelle or upper pylon, for example, a fuselage or nacelle of an aircraft. In such a case, the mast rotates with the spinner base 106. In an alternative embodiment, the spinner base 106 may be coupled to the mast system via the lower surface 107. In such a case, the spinner base 106 rotates with the mast. As used herein, the term "fixed relative to" generally refers to a lack of translation movement while allowing rotating movement and is intended to cover both of these embodiments, namely the embodiment where one part of the SFA 100 does not move laterally but allows rotation relative to the named object, and the embodiment where one part of the SFA 100 is affixed to the named object such that there is no lateral movement or rotation. In an embodiment, the space or interface between the lower surface 110 and the upper surface 108 may be small (e.g., about 0.025 inches, about 0.01 inches, about 0.05 inches, etc.) and may comprise air, oil, grease, or any suitable material there between.

Figure 5:
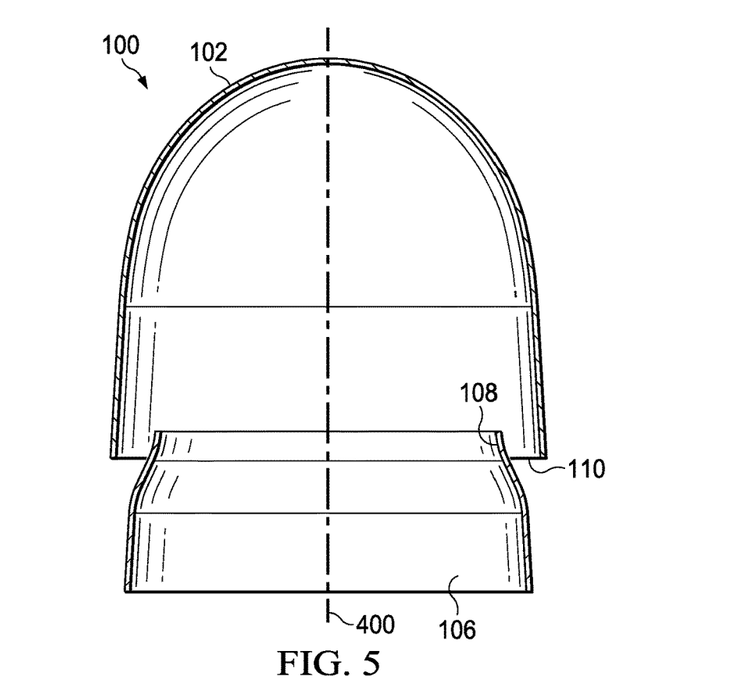
FIG. 5 is a profile view of another embodiment of a spinner fairing assembly in a centered position.

In an embodiment, the spinner 102 may be positionable with respect to the spinner base 106. For example, when the spinner 102 is coupled to the gimbaled yoke 150, the spinner 102 may be configured to be positioned and/or repositioned with respect to the spinner base 106 in response to the canting of the gimbaled yoke 150. In the embodiments of FIGS. 3 and 5, the spinner 102 is configured in a neutral or "centered" position with respect to the spinner base 106. In such an embodiment, the spinner 102 and the spinner base 106 may be coaxially centered and/or aligned along the axis 400. Additionally, when the spinner 102 is in the neutral position, the SFA 100 may be configured in the neutral configuration.

Figure 6:
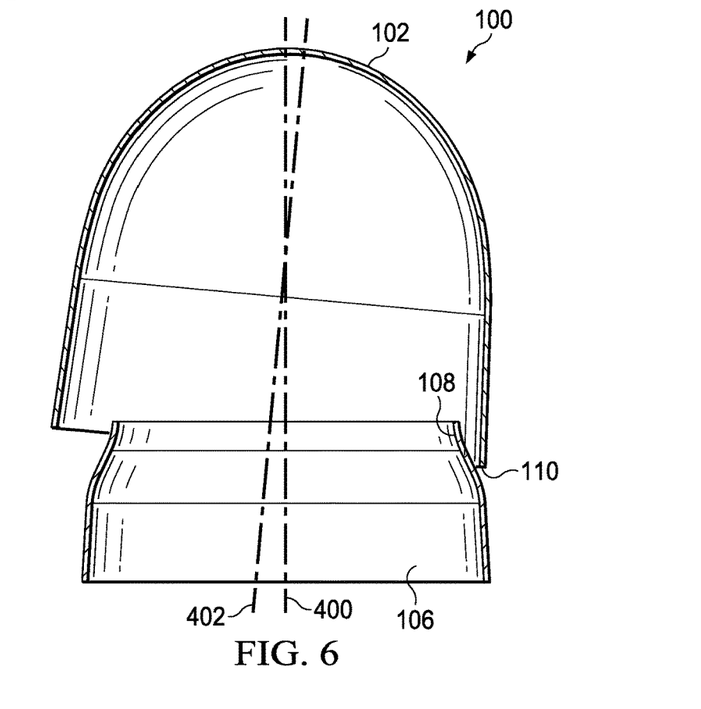
FIG. 6 is a profile view of another embodiment of a spinner fairing assembly in a tilted position.

In the embodiments of FIGS. 4 and 6, the spinner 102 is configured in a canted or "tilted" position with respect to the spinner base 106. In such an embodiment, the spinner base 106 may be centered and/or aligned along the axis 400 and the spinner 102 may be centered and/or aligned along a second axis 402, which is normal to the gimbaled yoke 150 plane. In such an embodiment, the axis 400 and the second axis 402 may not be substantially coincident, but meet at the gimbal origin. In an embodiment, the spinner 102 may be tilted at an angle with respect to the spinner base 106. For example, the spinner 102 may be tilted with respect to the spinner base 106 by an angle of about 0.1 degrees, about 0.5 degrees, about 1 degree, about 5 degrees, about 10 degrees, or any other suitable angle as would be appreciated by one of skill in the art upon viewing this disclosure. Additionally, when the spinner 102 is in the canted position, the SFA 100 may be configured in the canted configuration.

In an embodiment, when the spinner 102 is in the neutral position or canted position with respect to the spinner base 106, the spinner 102 and/or the spinner base 106 may be configured to disallow or substantially disallow exposure between the interior of the SFA 100 and the exterior of the SFA 100, thereby protecting and/or shielding the interior of the SFA 100 (e.g., the gimbaled yoke 150) from environmental conditions (e.g., rain, water, snow, sand, debris, etc.). Additionally, when the spinner 102 is in the neutral position or canted position with respect to the spinner base 106, the spinner 102 and/or the spinner base 106 may be configured to provide improved aerodynamic performance during operation, for example, via providing a more aerodynamic surface and reducing aerodynamic drag. For example, in the embodiment of FIGS. 2-4, the lower surface 110 of the spinner 102 may form a rounded lower surface and the upper surface 108 of the spinner base 106 may form a concave surface. In such an embodiment, the lower surface 110 of the spinner 102 may be configured to slidably engage the upper surface of the spinner base 106. For example, the lower surface 110 may slide along the upper surface 108 as the spinner 102 is positioned with respect to the spinner base 106 (e.g., transitioning from the neutral position to the canted position with respect to the second portion of the spinner base 106). Additionally, in such an embodiment, when the spinner 102 is in the canted position with respect to the spinner base 106, the lower surface 110 may be engaged (e.g., overlap) with the upper surface 108 such that the spinner 102 and/or the spinner base 106 are configured to disallow or substantially disallow exposure between the interior of the SFA 100 and the exterior of the SFA 100 and provide a more aerodynamic surface. Further, the spinner base 106 has a diameter less than the diameter of the spinner 102, and thus does not collect or capture passing air (e.g., does not form a "scoop") when the spinner 102 is canted (e.g., canted to a maximal angle) with respect to the spinner base 106.

In an alternative embodiment, for example as illustrated in FIGS. 5 and 6, the spinner 102 is parabolic shaped and the spinner base 106 is shaped as a truncated cone. The lower surface 110 of the spinner 102 may have a diameter greater than the upper surface 108 of the spinner base 106. For example, the spinner 102 may be overcut with respect to the spinner base 106 as shown in FIGS. 5 and 6. In such an embodiment, the spinner 102 may at least partially cover (e.g., overlap) a portion (e.g., the upper surface 108) of the spinner base 106. Additionally, in such an embodiment, when the spinner 102 is in the canted position with respect to the spinner base 106, the lower surface 110 may overlap the upper surface 108 such that the spinner 102 and/or the spinner base 106 are configured to provide a substantially continuous surface. Similar to the embodiment in FIGS. 2-4, no portion of the spinner base 106 extends past the spinner 102, which provides a smooth surface for passing air and a more aerodynamic surface.

Figure 7:
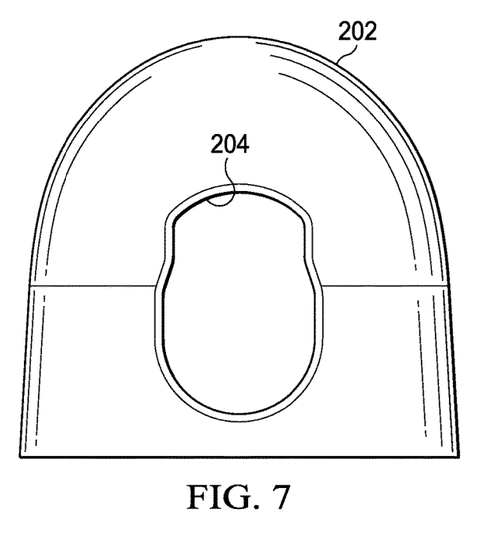
FIG. 7 is a side view of an embodiment of a spinner fairing assembly.
Figure 8:
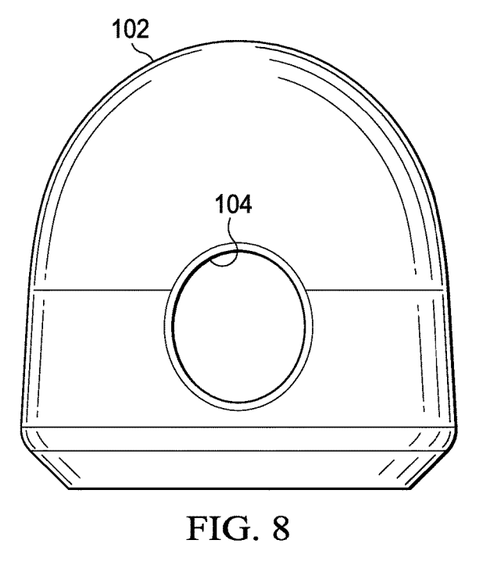
FIG. 8 is a side view of an embodiment of a spinner fairing assembly.

In an embodiment, the plurality of fairing ports 104 may be disposed radially about the spinner 102 (e.g., about the axis 400). In an embodiment, each of the fairing ports 104 may be suitably sized to allow a fairing 120 to extend there through and for articulated movements of the fairing 120 (e.g., coning, feathering, flapping, etc.). In such an embodiment, the plurality of fairing ports 104 may be configured to provide a minimal surface void area within the spinner 102. For example, in the embodiment of FIG. 7, in a conventional spinner fairing housing 202 which is fixed with respect to a mast or nacelle, the conventional spinner fairing housing 202 may comprise fairing ports 204 sized to provide suitable clearances and tolerances for the movements of a fairing. In the embodiment of FIG. 8, the spinner 102 is fixed and moves with the rotor assembly, thus the fairing ports 104 do not need to be sized to allow the fairings to move relative to the spinner. As such, the fairing port 104 of the spinner 102 may have an opening or void area substantially less than a conventional spinner fairing port (e.g., the fairing port 204 as shown in FIG. 7). In an embodiment, the fairing port 104 may comprise an opening or void area reduction of about 25%, 30%, 35%, 40%, 45%, 50%, 60%, or about any other suitable reduction percentage as would be appreciated by one of ordinary skill in the art upon viewing this disclosure, when compared to a conventional spinner fairing port. Additionally, in an embodiment, the spinner 102 may comprise any suitable number of fairing ports 104, for example, 2, 3, 4, 5, 6, 7, 8, 9, 10, etc.

Figure 9:
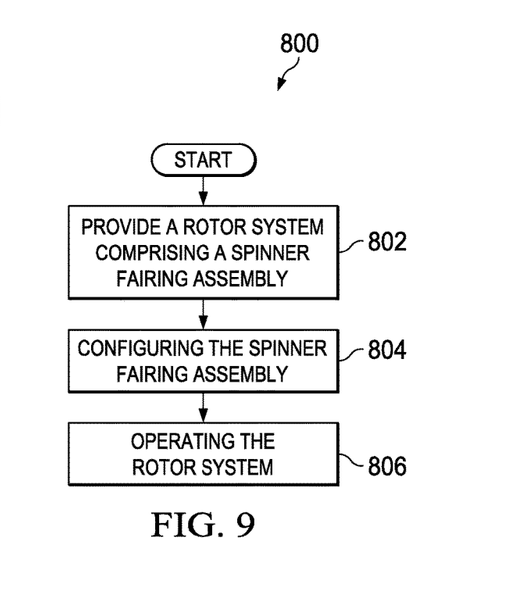
FIG. 9 is a flowchart of an embodiment of a spinner fairing positioning method.

In an embodiment, a spinner fairing positioning method utilizing a SFA and/or a system comprising a SFA is disclosed herein. In an embodiment, as illustrated in FIG. 9, a spinner fairing position method 800 may generally comprise the steps of providing a rotor system comprising a SFA 802, configuring the SFA 804, and operating a rotor system comprising the SFA 806.

In an embodiment, when providing a rotor system comprising a SFA 802, a rotor system, such as a rotor system 60, comprising a SFA, such as SFA 100, may be provided. For example, a rotor system 60 comprising a SFA 100 may be designed similar to that described herein, manufactured, and incorporated and/or integrated with an aircraft (e.g., a helicopter, a tilt rotor, etc.).

In an embodiment, configuring the spinner fairing assembly 804 may comprise positioning the spinner 102 of the SFA 100 with respect to the spinner base 106 of the SFA 100, for example, in response to positioning the gimbaled yoke 150 (e.g., in preparation to perform one or more movements and/or operations). For example, the spinner 102 may be positioned in the first or centered position with respect to the spinner base 106. Alternatively, the spinner 102 may be positioned in the second or tilted position with respect to the spinner base 106.

When operating a rotor system comprising the SFA 806, the rotor system 60 may perform one or more articulated movements (e.g., flapping, feathering, coning, etc.) and/or operations (e.g., rotating). In an embodiment, the gimbaled yoke 150 of the rotor system 60 may rotate about a mast or axis (e.g., axis 400). In such an embodiment, the spinner 102 of the SFA 100 is in a fixed position (e.g., coupled) with respect to the gimbaled yoke 150 and may rotate about the mast or axis. Additionally, in such an embodiment, the gimbaled yoke 150 may perform one or more articulated movements (e.g., flapping, feathering, coning, etc.) of one or more fairings 120.

In an embodiment, the process of configuring the SFA 804 and operating the rotor system comprising the SFA 806 may be repeated. For example, in a manner similar to that disclosed herein, the SFA 100 may be configured and/or reconfigured as needed during operation.

In an embodiment, a spinner fairing assembly, such as SFA 100, a rotor system comprising a SFA 100, such as the rotor system 60, a method of employing such a rotor system 60 and/or such a SFA 100, or combinations thereof may be advantageously employed to improve the aerodynamic performance (e.g., reduce aerodynamic drag) while maintaining normal operation functionality (e.g., during flapping, feathering, coning, etc.). In an embodiment, as previously disclosed, a SFA allows rotor system comprising a plurality of fairings or blades to perform articulated movements (e.g., flapping, feathering, coning, etc.) while reducing the size of ports or cut-outs required to allow for such articulated movements. As such, a SFA may be employed to provide improved aerodynamic performance during operation, for example, via providing a more aerodynamic surface and reducing aerodynamic drag.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. An apparatus comprising:
   a gimbaled yoke assembly coupled to a mast system, wherein the gimbaled yoke assembly controls the pitch of two or more blades connected to the gimbaled yoke; and
   a spinner fairing assembly that covers or shields the gimbaled yoke assembly comprising:
      a spinner comprising a convex surface and configured to be fixed relative to the gimbaled yoke coupled to a mast system, the gimbaled yoke assembly comprising two or more blades or fairings, wherein the spinner has an opening for each of the two or more blades or fairings;
      one or more mounting brackets connected to an inner surface of the spinner fairing that coupe the spinner fairing to a top portion of the gimbaled yoke; the one or more mounting bracket comprises two arms connected above the gimbaled yoke and extending out to a circumferential attachment section which conforms to the inner surface of the spinner fairing; and
      a spinner base comprising a concave surface configured to interface with the convex surface, the spinner base configured to be fixed relative to the mast system, and
   wherein the spinner is configured to tilt relative to the spinner base and wherein the spinner fairing assembly is configured to cover the gimbaled yoke assembly, the spinner fairing assembly comprising openings for the two or more blades or fairings,
   wherein the spinner is configured to transition between a neutral position and a canted position with respect to the spinner base, wherein the first axis and the second axis are coincident in the neutral position, and
   wherein the first axis and the second axis are not coincident and meet at an origin within the spinner in the canted position.

2. The apparatus of claim 1, wherein the spinner comprises a plurality of fairing ports radially disposed about the spinner, wherein the fairing ports are sized to position a fairing there through.

3. The apparatus of claim 1, wherein the interface between the convex surface covers the concave surface regardless of the position of the spinner relative to the spinner base.

4. The apparatus of claim 1, wherein the concave surface and the convex surface are each portions of two concentric spheres centered at the gimbaled yoke assembly origin.

5. The apparatus of claim 1, wherein the mast system is configured to rotate within the spinner base.

6. The apparatus of claim 1, wherein the mast system is affixed to the spinner base.

7. The apparatus of claim 1, further comprising an engine mechanically coupled to the mast system and an aircraft fuselage coupled to the engine.

8. A spinner fairing assembly comprising:
   a spinner aligned along a first axis and comprising a convex surface, the spinner configured to be fixed relative to a gimbaled yoke assembly coupled to a mast system, the gimbaled yoke assembly comprising two or more blades or fairings;
   one or more mounting brackets connected to an inner surface of the spinner fairing that couple to a top portion of the spinner fairing to the gimbaled yoke; the one or more mounting bracket comprises two arms connected above the gimbaled yoke and extending out to a circumferential attachment section which conforms to the inner surface of the spinner fairing; and
   a spinner base aligned along a second axis and comprising a concave surface configured to interface with the convex surface, the spinner base configured to interface with the spinner and to be fixed relative to the mast system,
   wherein the spinner is configured to transition between a neutral position and a canted position with respect to the spinner base,
   wherein the first axis and the second axis are coincident in the neutral position, and
   wherein the first axis and the second axis are not coincident and meet at an origin within the spinner in the canted position and wherein the spinner fairing assembly is configured to cover at least a portion of the gimbaled yoke assembly, the spinner fairing assembly comprising openings for the two or more fairings.

9. The spinner fairing assembly of claim 8, wherein the spinner comprises a plurality of fairing ports radially disposed about the spinner, wherein the fairing ports are sized to position a fairing there through.

10. The spinner fairing assembly of claim 8, wherein a lower diameter of the spinner covers an upper diameter of the spinner base regardless of the position of the spinner relative to the spinner base.

11. The spinner fairing assembly of claim 8, wherein the concave surface and the convex surface are each portions of two concentric spheres centered at the origin.

12. The spinner fairing assembly of claim 8, wherein the mast system is configured to rotate within the spinner base.

13. The spinner fairing assembly of claim 8, wherein the mast system is affixed to the spinner base.

14. A method comprising:
   coupling a gimbaled yoke assembly to a mast system, wherein the gimbaled yoke assembly controls the pitch of two or more blades connected to the gimbaled yoke; and providing a spinner fairing assembly that covers or shields the gimbaled yoke assembly comprising:

a spinner aligned along a first axis and comprising a convex surface, the spinner configured to be fixed relative to a gimbaled yoke coupled to a mast system, the gimbaled yoke comprising two or more blades or fairings;

one or more mounting brackets connected to an inner surface of the spinner fairing that couple the spinner fairing to a top portion of the gimbaled yoke; the one or more mounting bracket comprises two arms connected above the gimbaled yoke and extending out to a circumferential attachment section which conforms to the inner surface of the spinner fairing; and a spinner base aligned along a second axis and comprising a concave surface configured to interface with the convex surface, the spinner base configured to interface with the spinner and to be fixed relative to the mast system and transitioning the spinner between a neutral position and a canted position with respect to the spinner base, wherein the first axis and the second axis are coincident in the neutral position, and wherein the first axis and the second axis are not coincident and meet at an origin within the spinner in the canted position and wherein the spinner fairing assembly is configured to cover at least a portion of the gimbaled yoke assembly, the spinner fairing assembly comprising openings for the two or more blades or fairings.

15. The method of claim 14, wherein providing the spinner fairing assembly comprises assembling an aircraft comprising the spinner and spinner base.

16. The method of claim 14, further comprising slidably engaging the convex surface of the spinner with the concave surface of the spinner base.

* * * * *